United States Patent
Adogla et al.

(10) Patent No.: US 8,615,589 B1
(45) Date of Patent: Dec. 24, 2013

(54) RESOURCE OPTIMIZATION RECOMMENDATIONS

(75) Inventors: Eden G. Adogla, Seattle, WA (US); Awo D. Ashiabor, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 231 days.

(21) Appl. No.: 13/169,999

(22) Filed: Jun. 27, 2011

(51) Int. Cl.
G06F 15/173 (2006.01)

(52) U.S. Cl.
USPC .......................................... 709/226

(58) Field of Classification Search
USPC ................................. 709/224, 226
See application file for complete search history.

(56) References Cited

U.S. PATENT DOCUMENTS

| | | | |
|---|---|---|---|
| 2011/0099267 A1* | 4/2011 | Suri et al. | 709/224 |
| 2011/0185063 A1* | 7/2011 | Head et al. | 709/226 |
| 2011/0231696 A1* | 9/2011 | Ji et al. | 714/3 |
| 2012/0089726 A1* | 4/2012 | Doddavula | 709/224 |

* cited by examiner

*Primary Examiner* — Jason Recek
(74) *Attorney, Agent, or Firm* — Knobbe, Martens, Olson & Bear, LLP (57) ABSTRACT

A resource optimization manager monitors resource metrics of a set of virtual machine instance types and determines a set of applications associated with the virtual machine instance types and associates the resource metrics to the set of applications. Thereafter, the resource optimization manager can generate clusters of applications that share one or more similar attributes and store resource optimizations for the clustered applications. The resource optimization manager can obtain a designation of a target application run on a virtual machine instance or otherwise obtain a definition of an application. The resource optimization manager can then associate the target application with one or more of the clustered applications based on a comparison of similarities between the clustered applications and the target applications.

27 Claims, 6 Drawing Sheets

RESOURCE OPTIMIZATION RECOMMENDATIONS

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. With virtualization, the single physical computing device can create, maintain, delete, or otherwise manage virtual machines in a dynamic matter. In turn, users can request computer resources from a data center, including single computing devices or a configuration of networked computing devices, and be provided with varying numbers of virtual machine resources.

In some scenarios, instances of a virtual machine may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which a computing device may process in order to implement the desired software configuration. In other scenarios, instances of a virtual machine may be considered to be generic such that operating systems or operating system configurations, virtualized hardware resources and software applications are not necessarily optimized for a particular function.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Generally described, aspects of the present disclosure relate to the management of virtual machine instances. Specifically, systems and methods are disclosed which facilitate generation of optimizations for target virtual machine instances. In one aspect, a resource optimization manager monitors resource metrics of a set of virtual machine instance types. The resource optimization manager determines a set of applications associated with the virtual machine instance types and associates the resource metrics to the set of applications. Thereafter, the resource optimization manager can generate clusters of applications that share one or more similar attributes and store resource optimizations for the clustered applications.

In another aspect, the resource optimization manager can obtain a designation of a target application run on a virtual machine instance or otherwise obtain a definition of an application. The resource optimization manager can then associate the target application with one or more of the clustered applications based on a comparison of similarities between the clustered applications and the target applications. Using the resource optimizations previously determined for a selected application cluster, the resource optimization manager can then publish, implement, recommend or otherwise distribute/designate resource optimizations for the target application. While specific embodiments and example applications of the present disclosure will now be described with reference to the drawings, these embodiments and example applications are intended to illustrate, and not limit, the present disclosure. Specifically, while various embodiments and aspects of the present disclosure will be described with regard to virtual machine instances running applications, one or more aspects of the present disclosure can be applied with physical computing devices or combinations of physical computing devices and virtual machine instances.

Figure 1:
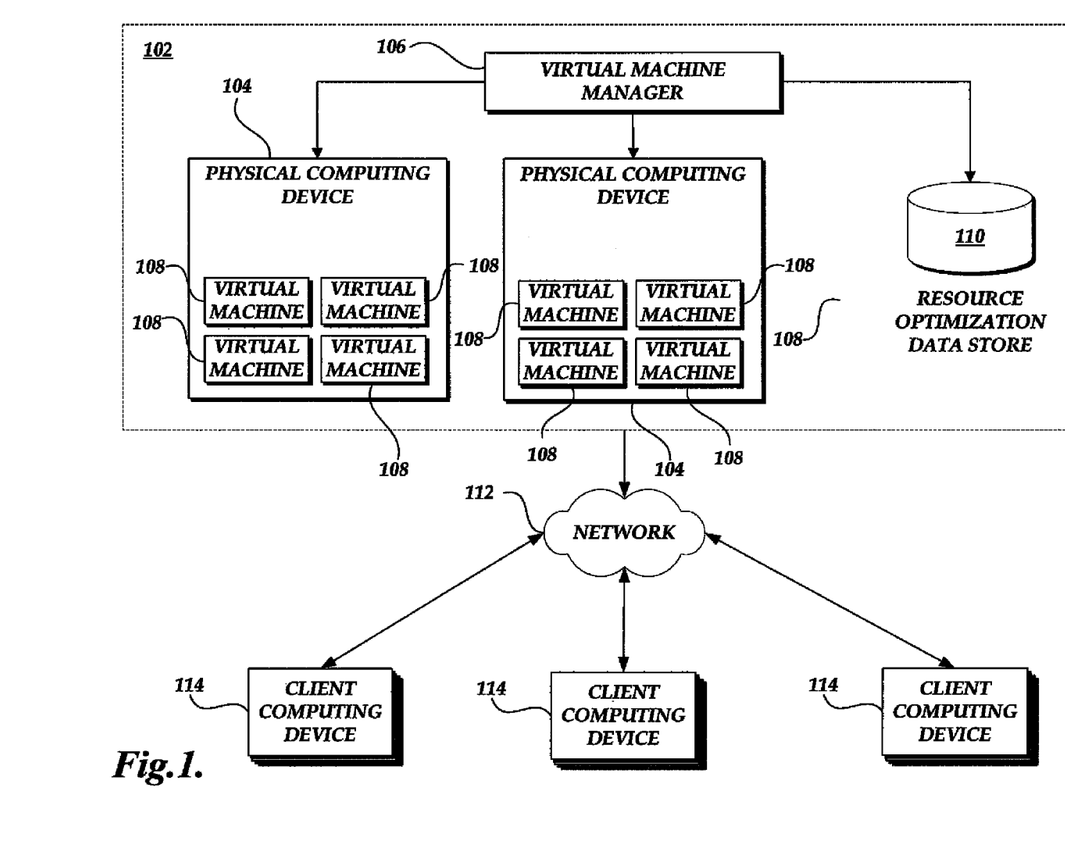
FIG. 1 is a block diagram depicting an illustrative environment for managing virtual machine instance types including a number of computing devices, a number of collections of computing devices, and a resource optimization manager.

FIG. 1 is a block diagram illustrating an embodiment of a virtual network environment 100. The virtual network environment 100 includes a virtual network 102 that includes multiple physical computing devices 104. Each physical computing device 104 is capable of hosting multiple virtual machine instances 108. At least some of the virtual machine instances 108 may be provisioned to provide a variety of different desired functionalities depending on the needs of the data center. Examples of the types of desired functionality, include but are not limited to: database management, serving or distributing data or content (e.g., Web servers), managing load balancing or network resources, managing network connectivity or security, providing network addressing information, managing client or server redirection, or any other functionality associated with a data center. Additionally, one or more virtual machine instances 108 may be provisioned generically when a desired functionality is not specified or is otherwise not available. One skilled in the relevant art will appreciate that the virtual network 102 is logical in nature and can encompass physical computing devices 104 from various geographic regions.

The virtual network 102 also includes resource optimization manager component 106 for monitoring resource metrics associated with software applications implemented within a set of virtual machine instance types. As will be explained in greater detail below with regard to FIGS. 2A-2C, the resource optimization manager component 106 may provide resource optimizations for generic or unknown virtual machine instances or instance types based on observed resource metrics for a clustered set of application corresponding to a set of known virtual machine instance types. As another example, the resource optimization manager component 106 may execute as a remote or distributed process on one or more physical or logical computing devices 104, which may also be executed in a virtualized operating environment. It should be appreciated that, although the resource optimization manager 106 is depicted for the purpose of example as a single logical component in illustrative FIG. 1, the routines and steps performed by the resource optimization manager component 106 may be distributed among any number of components and executed in hardware or software. Additionally, although the resource optimization manager component 106 is illustrated as logically associated with virtual network 102, the resource optimization manager component 106 may be implemented in a separate networked environment or in conjunction with client computing devices 114.

With continued reference to FIG. 1, the virtual network 102 can further include a resource optimization data store 110 for maintaining application cluster information, such as a definition of application clusters, resource metric information for associating application clusters with target applications and resource optimization information for associated application clusters. The resource optimization data store 110 may correspond to network attached storage (NAS), database servers, which may be implemented in a centralized or distributed manner.

Connected to the virtual network 102 via a network 112 are multiple client computing devices 114. The network 112 may be, for instance, a wide area network (WAN), a local area network (LAN), or a global communications network. In some instances, the client computing devices 114 may interact with the virtual network 102 to request the resource optimizations for virtual machine instance types based on a definition of one or more applications associated with the virtual machine instance type.

Figure 2A:
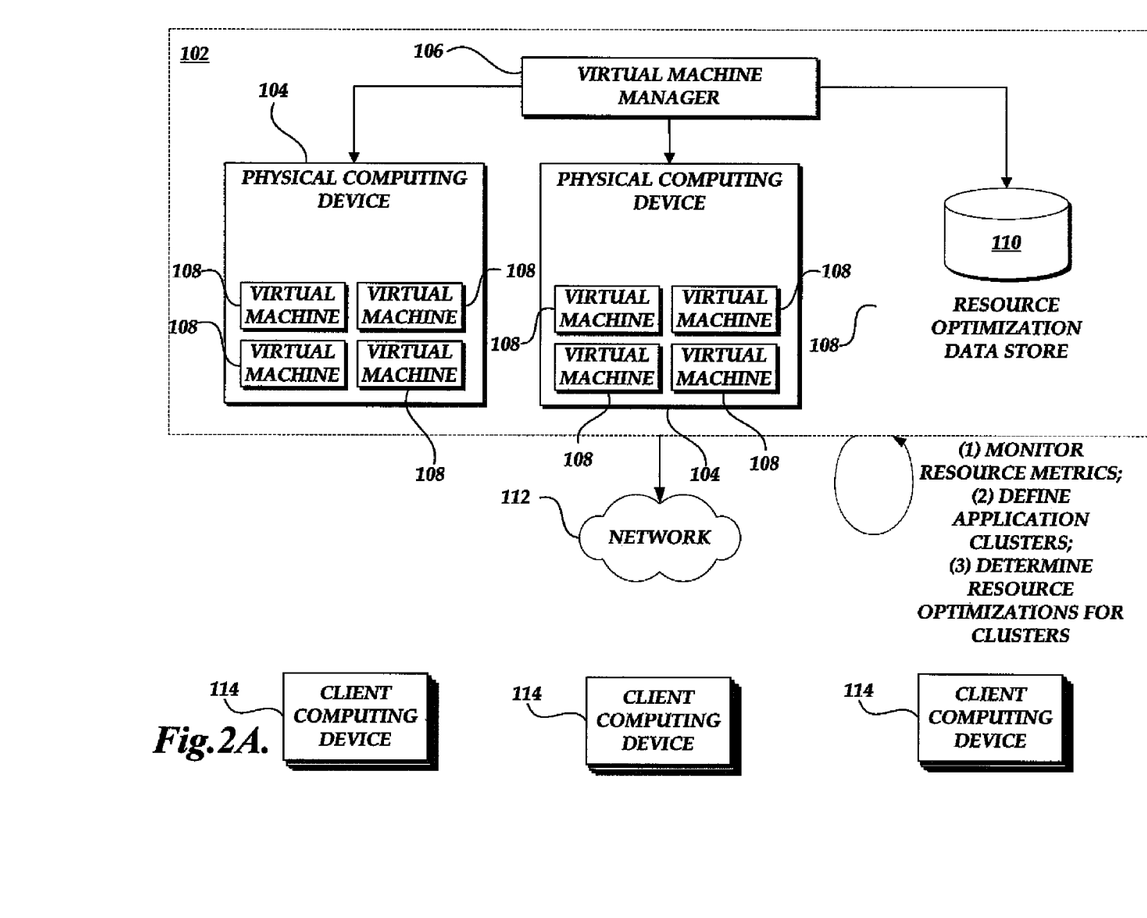
FIG. 2A is a simplified block diagram of the virtual network of FIG. 1 illustrating the generation application clusters for a set of virtual machine instance types.
Figure 2B:
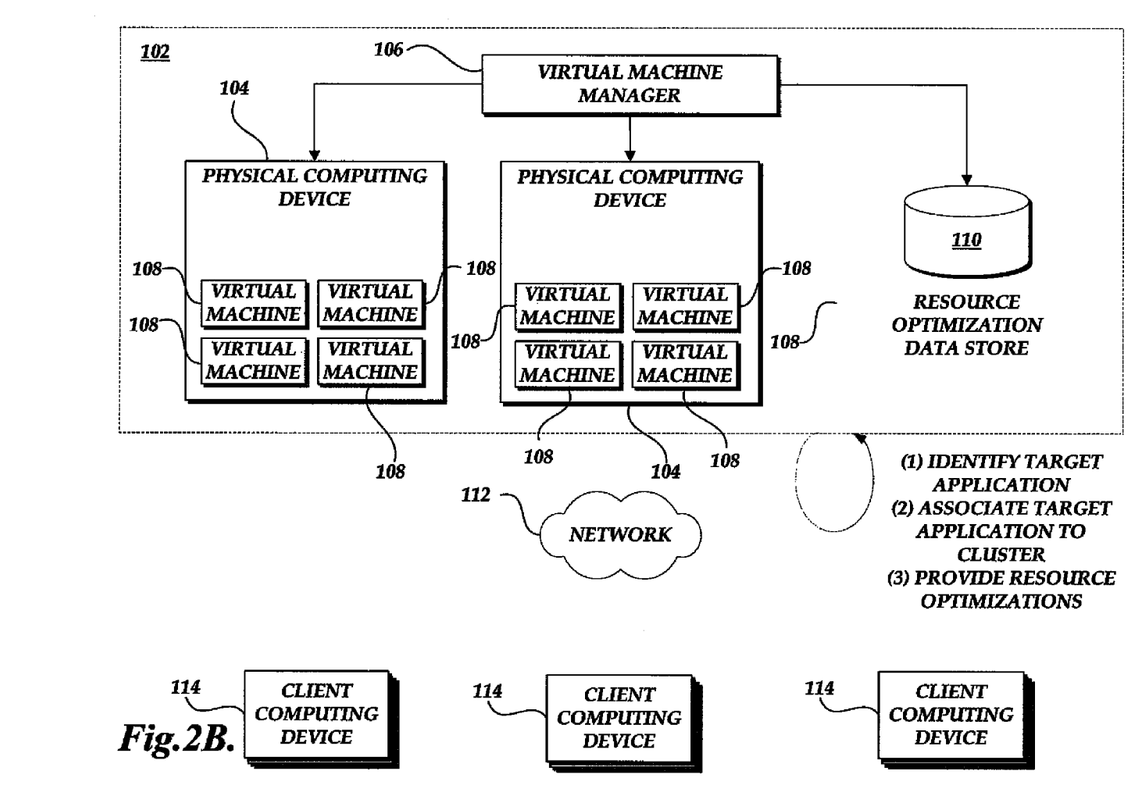
FIG. 2B is a simplified block diagram of the virtual network of FIG. 1 illustrating the generation resource optimizations based on matching a target application with application clusters for a set of virtual machine instance types.
Figure 2C:
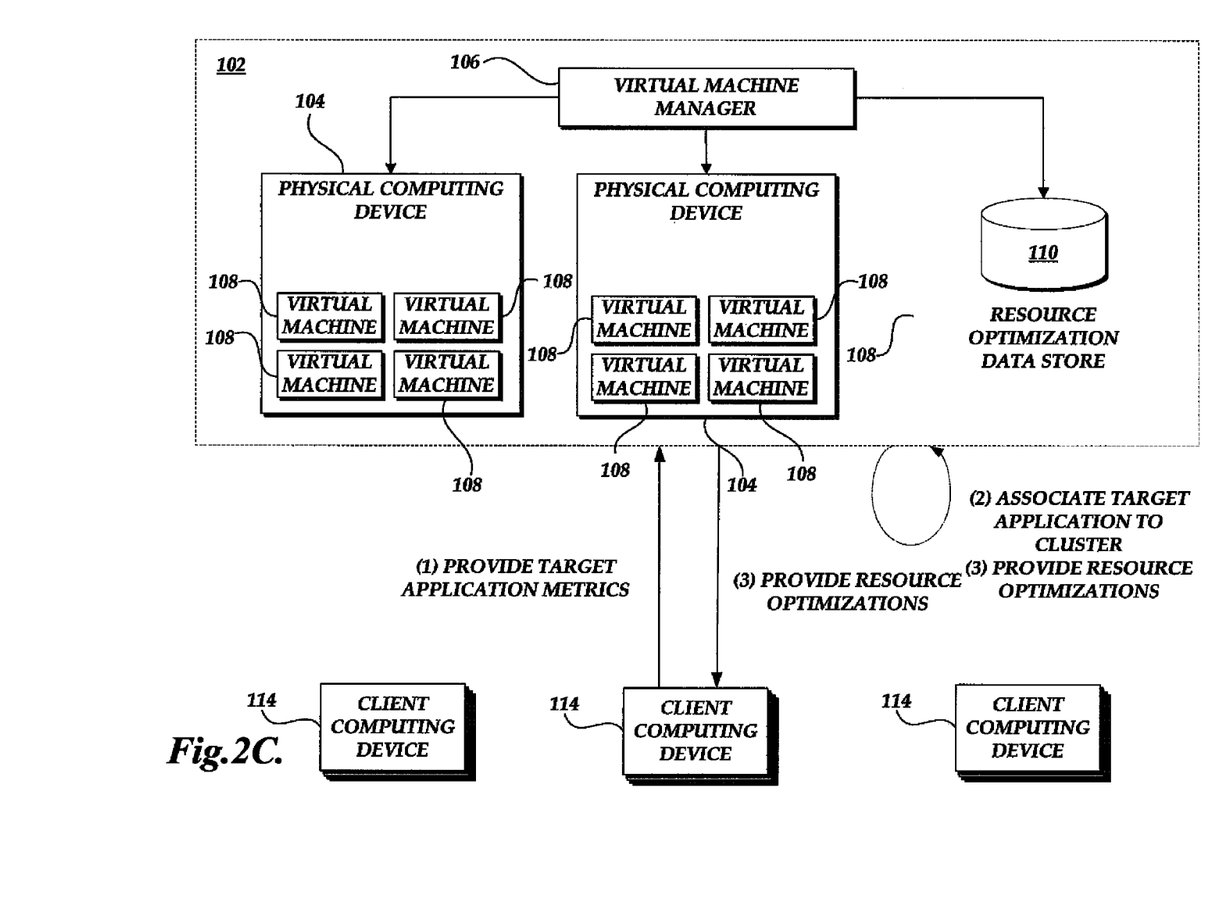
FIG. 2C is a simplified block diagram of the virtual network of FIG. 1 illustrating the generation resource optimizations based on matching a target application with application clusters for a set of virtual machine instance types

FIGS. 2A, 2B, and 2C are block diagrams of the networked computing environment of FIG. 1 illustrating the determination of application clusters and the association of application clusters with a target application. With reference to FIG. 2A, the resource optimization manager component 106 can determine clusters of applications based on monitoring the execution of one or more instances of a virtual machine instance types 108. Specifically, the resource optimization manager component 106 can instantiate a number of instances of a virtual machine instance type, or cause the instantiation of the instances. Additionally, the resource optimization manager component 106 can observe resource metrics associated with the execution of the instantiated virtual machine instance type. Illustratively, the resource metrics can include a variety of information related to the utilization of the virtualized (or actual) resources, including, but not limited to, the extent and frequency of central processing unit (CPU) usage, memory latency and sustained bandwidth, disk latency and bandwidth (including network disk I/O), general network latency and bandwidth, graphics processing unit (GPU) usage, and the like. The resource metrics can be associated with the possible execution environments provided by the physical computing devices 104.

For the set of instantiated virtual machine instance types, the resource optimization manager component 106 can identify one or more applications that are being executed in the virtual machine instance types. Utilizing the defined resource metrics and observed resource values for the defined resource metrics, the resource optimization manager component 106 then defines application clusters by grouping applications in accordance with commonality or characteristics of the observed resource metrics. For example, applications may be grouped or clustered based on a commonality of memory usage and memory access. Illustratively, the resource optimization manager component 106 can utilize one or more thresholds for determining the allowable variance between resource metrics in the grouped/clustered applications. In one embodiment, the monitored resource metrics and the applications that may be grouped into clusters may be selected in advance. In other embodiments, the identification of the monitored resource metrics and applications that may be grouped into clusters may be dynamically inferred, at least in part, on observations (or observable resource metrics/applications) of the instantiated virtual machine instances.

Illustratively, once the resource optimization manager component 106 has generated the clustered set of applications, the resource optimization manager component 106 can then store or otherwise associate other resource optimizations that facilitate the execution of the application in the instantiated instances of the virtual machine instance type. For example, the resource optimization may the selection of particular operating environment, selection of available virtualized resources, minimum physical resources, etc. Illustratively, the resource optimization manager component 106 can continuously refine the set of application that are clustered or the resource optimizations that are associated with particular application clusters based on a continuous, or semi-continuous, repetition of the interaction illustrated in FIG. 2A.

With reference now to FIG. 2B, in one embodiment, the resource optimization manager component 106 can utilize the clustered applications to provide resource optimizations, resource recommendations, or other recommendations, based on associating a target application with one or more clusters of applications. As illustrated in FIG. 2B, in this embodiment, the resource optimization manager component 106 identifies a target application that has been instantiated on one of the virtual machine instances 108. In one aspect, the target application may be identified by a user or system administrator (corresponding to a client computing 114). For example, a user may request resource optimizations or resource recommendations from the resource optimization manager component 106. In another aspect, the resource optimization manager component 106 may identify any application running on a generic virtual machine instance type as the target application. In still another aspect, the resource optimization manager component 106 may identify any application in which the virtual machine instance may have been allocated a default set of resource optimizations as the target application.

Once the target application has been identified, the resource optimization manager component 106 associates the target application to one or more application clusters. In one embodiment, the resource optimization manager component 106 obtains resource metrics for the target application and attempts to associate one or more clustered applications that are most similar to the resource metrics of the target application. The resource metrics obtained for the target application can be the same set of resource metrics, a different set of resource metrics (compared to the set of resource metrics for the clustered applications), or a subset of the set of resource metrics for the clustered applications. In the event that a target application may be sufficiently associated with more than one application cluster, the resource optimization manager component 106 can look to additional or alternative resource metrics, user input, or other selection criteria to identify a single cluster of applications most similar to the target application.

Based on the associated cluster of applications, the resource optimization manager component 106 can then select resource optimizations previously associated with the selected application cluster as resource optimizations for the target application. For example, the resource optimization manager component 106 may define minimum, maximum, optimal, preferred, or prohibited or non-recommended resource values (e.g., allocated memory, CPUs, etc.) for the target application based on corresponding values or configurations shared by the clustered applications. In one aspect, the resource optimization manager component 106 can then publish the resource optimizations/recommendations to the requesting client computing device 114 or to a system administrator associated with the target application. In another aspect, the resource optimization manager component 106 can update the clustered application to include the target application for future processing of new target applications. In still a further aspect, the resource optimization manager component 106 can implement at least a portion of the resource optimizations in the target application. For example, the resource optimization manager component 106 can cause a new instance of a virtual machine incorporating at least a portion of the resource optimizations and the cause the target application to be migrated to the newly instantiated virtual machine instance.

With reference now to FIG. 2C, in another embodiment, the resource optimization manager component 106 can utilize clustered applications to provide resource optimizations, resource recommendations, or other recommendations, based on associating a definition of a target application with one or more clusters of applications. In the embodiment illustrated in FIG. 2C, the resource optimization manager component 106 identifies a target application by receipt of an inquiry transmitted by a requesting client computing device. In one aspect, the client computing device can utilize an application protocol interface (API) in which one or more aspects of a target application may be defined by a user or system administrator (corresponding to a client computing 114). Still further, the API can also be utilized to define a set of resource metrics or values for selected/identified resource metrics that will be used to associate the target application to one or more clusters of applications. Thus, the identified target application in the embodiment of FIG. 2C may not be an application being executed in the virtual network 102, but can correspond to a proposed or projected application. In an alternative embodiment, the identified target application can also be based, at least in part, on application being executed on an instantiated virtual machine instance in which one or more resource metric values or configurations are modified, such as via an API.

Based on the identified target application, the resource optimization manager component 106 associates the target application to one or more application clusters. In one embodiment, the resource optimization manager component 106 obtains resource metrics for the target application (either by direct observation or by definition) and attempts to associate one or more clustered applications that are most similar to the resource metrics of the target application. The resource metrics obtained for the target application can be the same set of resource metrics, a different set of resource metrics (compared to the set of resource metrics for the clustered applications), or a subset of the set of resource metrics for the clustered applications. In the event that a target application may be sufficiently associated with more than one application cluster, the resource optimization manager component 106 can look to additional or alternative resource metrics, user input, or other selection criteria to identify a clustered set of application most similar to the target application.

Based on the associated clustered applications, the resource optimization manager component 106 can then select resource optimizations previously associated with the selected application cluster as resource optimizations for the target application. For example, the resource optimization manager component 106 may define minimum or maximum virtual resources (e.g., allocated memory, CPUs, etc.) for the target application based on the minimum or maximums shared by the clustered applications. In one aspect, the resource optimization manager component 106 can then publish the resource optimizations/recommendations responsive to the requesting client computing device 114 or to a system administrator associated with the target application. In another aspect, the resource optimization manager component 106 can update the clustered application to include the target application for future processing of new target applications. In still a further aspect, the resource optimization manager component 106 can implement at least a portion of the resource optimizations in the target application (if the target application is actually being executed). In still another aspect, the resource optimization manager component 106 can transmit the resource optimizations in an API and repeat the process in an iterative attempt to continuously optimize resources for a definition of an application.

Figure 3:
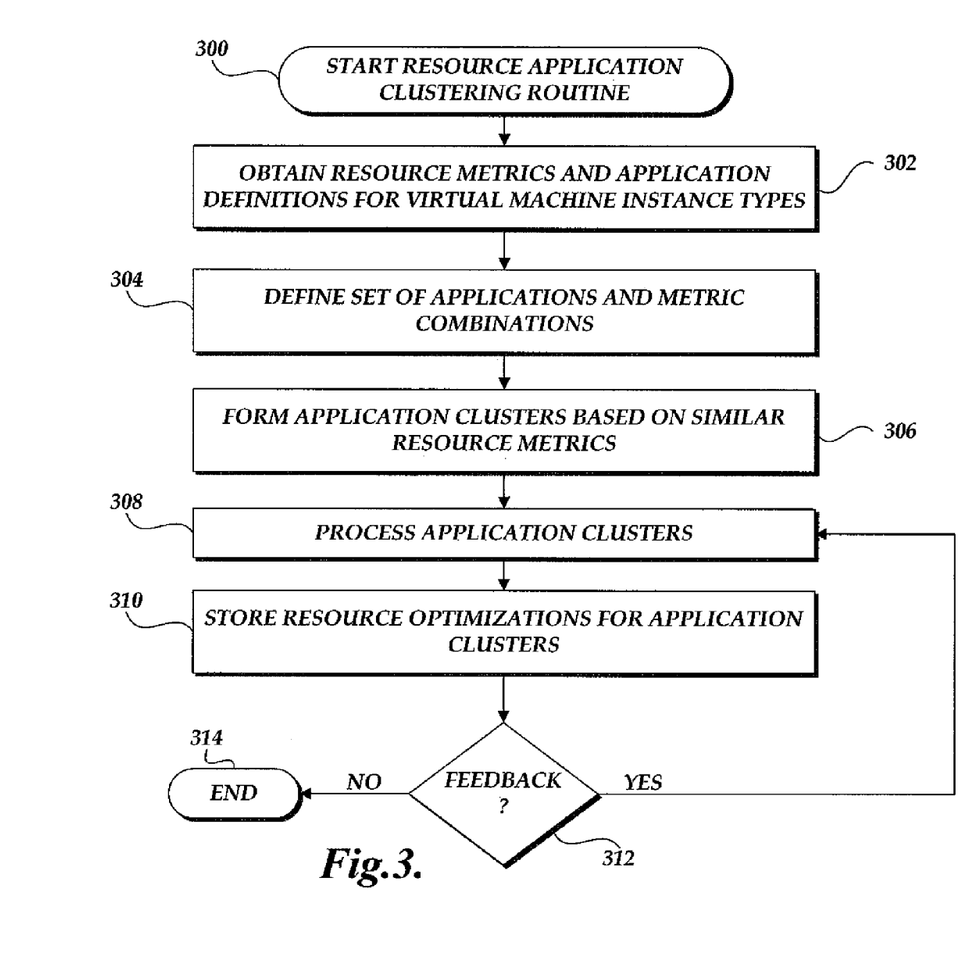
FIG. 3 is a flow diagram illustrating a resource application clustering routine implemented by a resource optimization manager.

Turning now to FIG. 3, a routine 300 implemented by the resource optimization manager component 106 for resource application clustering will be described. Although routine 300 will be described with regard to implementation by the resource optimization manager component 106, one skilled in the relevant art will appreciate that alternative components may implement routine 300 or that one or more of the blocks may be implemented by a different component or in distributed manner.

At block 302, the resource optimization manager component 106 defines resource metrics and application definitions for a set of virtual machine instance types. Illustratively, the resource metrics can include a variety of information related to the utilization of the virtualized (or actual) resources, including, but not limited to, the extent and frequency of central processing unit (CPU) usage, memory latency and sustained bandwidth, disk latency and bandwidth (including network disk I/O), general network latency and bandwidth, graphics processing unit (GPU) usage, and the like. The resource metrics can be associated with the possible execution environments provided by the physical computing devices 104. Additionally, the resource optimization manager component 106 can utilize a portion of the resource metrics to define possible the execution environment. For example, an execution environment may be defined in terms of a selection of select set of resources, such as CPU, disk and memory resources, operating system, and the like.

As previously described, in one embodiment, the definition of the monitored resource metrics and the applications that may be grouped into clusters may be selected in advance. For example, the monitored resource metrics that will be used to determine clusters of applications may be specified in accordance with an API submitted to the resource optimization manager component 106. In another embodiment, the resource optimization manager component 106 can instantiate a number of instances of a virtual machine instance type and observe resource metrics associated with the execution of the instantiated virtual machine instance type, often referred to as an execution environment, runtimes or runtime environment. Additionally, the resource optimization manager component 106 can analyze each virtual machine instance type to identify the applications that will be utilized to form the application clusters. In this regard, the resource optimization manager component 106 can select applications that have minimum or threshold resource consumption, have been executed a threshold amount of times, and the like. The resource optimization manager component 106 can then utilize additional data processing techniques, such as statistical processing, normalization, etc. to update and refine the collected resource metrics and definition of applications.

At block 304, the resource optimization manager component 106 defines a set of applications and resource metrics that will be utilized to group/cluster the applications. In one aspect, the set of resource metrics associated with the application can be predetermined as discussed with regard to block 302. In another aspect, the set of resource metrics can be dynamically selected or refined by the resource optimization manager component 106. For example, the resource optimization manager component 106 may select from a number of potential resource metrics in order to define a minimal number or maximum number of application groups (e.g., remove resource metrics in which all the applications have a common value for a resource metric).

At block 306, the resource optimization manager component 106 forms one or more application clusters based on similar resource metrics. As previously described, the resource optimization manager component 106 can utilize one or more thresholds for determining the allowable variance in comparing the resource metrics in the grouped/clustered applications with the resource metrics associated with the target application. Illustratively, the resource optimization manager component 106 can also limit the comparison of resource metrics for the target application to steady state values based on historical resource metric data for the target application. Additionally, in one embodiment, the resource optimization manager component 106 can select a proxy application and proxy resource metric values that will be representative of applications associated with a family of applications. The proxy resource metric values may be actual values based on the selected proxy application. Alternatively, the proxy resource metric values may be based on blended or averaged resource metric values.

At block 308, the resource optimization manager component 106 can process the resulting application clusters to refine the definition or modify the resource metrics that are associated with formed clusters. In one embodiment, the resource optimization manager component 106 may increase the set of virtual machine instances to allow for more consideration of more applications. In another embodiment, the resource optimization manager component 106 can adjust or refine the thresholds utilized to define the clustering, such as by receiving user input regarding the adjustments. In another embodiment, the resource optimization manager component 106 can facilitate various "what if" scenarios from a system administrator to allow for the testing/projection of different resource metrics, resource metric thresholds, etc. Still further, the resource optimization manager component 106 can make modifications to modify the resource metrics considered or adjust any threshold as part of data verification or in order to establish a confidence value that the appropriate application cluster has been selected.

At block 310, the resource optimization manager component 106 stores the definition of the application clusters, the selection of resource metrics and representative values that will be utilized to associate clusters with target applications, and the resource optimizations that will be utilized to provide to an associated target application. In one embodiment, the resource optimization manager component 106 can receive feedback or enter into an iterative process for defining the application clusters. As illustrated at decision block 312, if there is feedback provided to the resource optimization manager component 106, the routine 300 returns to block 304 for refinement of the application groups/clusters. If not the routine 300 terminates at block 314.

Figure 4:
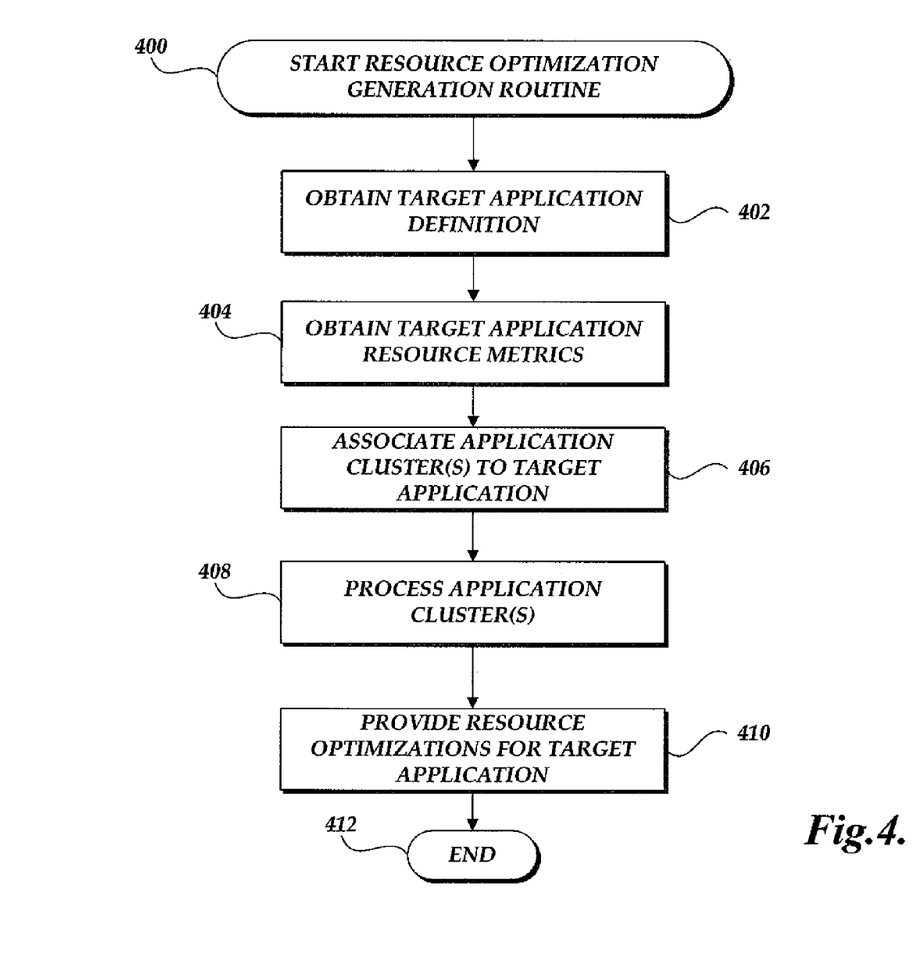
FIG. 4 is a flow diagram illustrative a resource optimization generation routine implemented by a resource optimization manager.

Turning now to FIG. 4, a routine 400 for associating target applications with application clusters will be described. As discussed with regard to routine 300 (FIG. 3), although routine 400 will be described with regard to implementation by the resource optimization manager component 106, one skilled in the relevant art will appreciate that alternative components may implement routine 400 or that one or more of the blocks may be implemented by a different component or in distributed manner. At block 402, the resource optimization manager component 106 obtains a target application definition. As previously described, the target application may be identified by a user or system administrator (corresponding to a client computing 114). For example, a user may request resource optimizations or resource recommendations from the resource optimization manager component 106. In another aspect, the resource optimization manager component 106 may identify any application running on a generic virtual machine instance type as the target application. In still another aspect, the resource optimization manager component 106 may identify any application in which the virtual machine instance may have been allocated a default set of resource optimizations as the target application. In still a further aspect, the resource optimization manager component 106 can utilize an application protocol interface (API) in which the target application may be identified by a user or system administrator (corresponding to a client computing 114). Still further, the API can also be utilized to define a set of resource metrics that will be used to associate the target application.

At block 404, the resource optimization manager component 106 obtains the target application resource metrics. In one embodiment, the resource optimization manager component 106 obtains resource metrics for the target application and attempts to associate one or more clustered applications that are most similar to the resource metrics of the target application. The resource metrics obtained for the target application can be the same set of resource metrics, a different set of resource metrics (compared to the set of resource metrics for the clustered applications), or a subset of the set of resource metrics for the clustered applications. In another embodiment, the target application resource metrics may be identified in an API or a source for the target application resource metrics may be provided via an API.

At block 406, the resource optimization manager component 106 associates the target application with one or more application clusters by attempting to match the obtained target application resource metrics with the resource metrics associated for the clustered applications. In one embodiment, each resource metric is given equal weight and the cluster having the most matches is considered the closest for purposes on associating a cluster of applications to a target application. In another embodiment, resource metrics may be given different weighs based on criteria such as designation of importance, historical information, user input, etc. In the event that a target application may be sufficiently associated with more than one application cluster, at block 408, the resource optimization manager component 106 can look to additional or alternative resource metrics, user input, or other selection criteria to identify a clustered set of application most similar to the target application.

At block 410, the resource optimization manager component 106 provides resource optimizations/recommendations for the target application. In one example, the resource optimization manager component 106 may define minimum or maximum virtual resources (e.g., allocated memory, CPUs, etc.) for the target application based on the minimum or maximums shared by the clustered applications. In one aspect, the resource optimization manager component 106 can then publish the resource optimizations/recommendations to the requesting client computing device 114 or to a system administrator associated with the target application. In another aspect, the resource optimization manager component 106 can update the clustered application to include the target application for future processing of new target applications. In still a further aspect, the resource optimization manager component 106 can implement at least a portion of the resource optimizations in the target application. For example, the resource optimization manager component 106 can cause a new instance of a virtual machine incorporating at least a portion of the resource optimizations and the cause the target application to be migrated to the newly instantiated virtual machine instance. At block 412, the routine 400 terminates.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method for managing virtual machine instance types, comprising:
   defining, by a resource optimization manager, resource metrics for a set of virtual machine instance types, wherein each of the virtual machine instance types is associated with one or more applications executed by the virtual machine instance type;
   defining, by the resource optimization manager, one or more applications for each of the set of virtual machine instance types;
   defining, by the resource optimization manager, a definition of clusters of applications based on similarities in at least a subset of the obtained resource metrics for the set of virtual machine instance types;
   obtaining, by resource optimization manager, a target application, wherein the target application is not associated with the definition of the clusters of applications;
   obtaining, by the resource optimization manager, resource metrics for the target application;
   associating, by the resource optimization manager, the target application with one or more clusters of applications, based, at least in part, on similarities between the target application and the one or more clusters of applications;
   obtaining, by the resource optimization manager, resource optimizations for the target application, the resource optimizations based on resource optimizations associated with the associated cluster of applications;
   causing, by the resource optimization manager, at least one of the implementation of the resource optimizations for the target virtual machine instance type and a publication of the resource optimizations for the target virtual machine instance type; and
   updating the definition of the one or more clusters of applications associated with the target application to include the target application.

2. The method as recited in claim 1, wherein obtaining, by the resource optimization manager, resource metrics for a set of virtual machine instance types includes at least one of frequency of central processing unit usage, frequency of usage of central processing unit instructions, memory latency and sustained bandwidth, disk latency and bandwidth, general network latency and bandwidth, and graphics processing unit usage.

3. The method as recited in claim 1, wherein defining, by the resource optimization manager, clusters of applications based on similarities in at least a subset of the obtained resource metrics for the set of virtual machine instance types includes a identifying at least one resource metric have a minimum number of different values.

4. The method as recited in claim 1, wherein obtaining, by the resource optimization manager, resource metrics for the target application includes obtaining a subset of the resource metrics associated with the clustered applications.

5. The method as recited in claim 1, wherein obtaining, by the resource optimization manager, resource metrics for the target application includes obtaining the resource metrics associated with the clustered applications.

6. The method as recited in claim 1, wherein associating, by the resource optimization manager, the target application with one or more clusters of applications includes associating the target application with a plurality of clusters of applications.

7. The method as recited in claim 6 further comprising determining at least one additional resource metric for selecting among the plurality of clusters of applications.

8. The method as recited in claim 1, wherein obtaining, by the resource optimization manager, resource optimizations for the target application includes obtaining a definition of at least a minimum and maximum set of virtual resources for the target application based on the minimum or maximums shared by the clustered applications.

9. The method as recited in claim 1 further comprising obtaining feedback regarding a definition used to define the clusters of applications.

10. The method as recited in claim 1, wherein defining the resource metrics for a set of virtual machine instance types and defining the one or more applications for each of the set of virtual machine instance types is determined dynamically.

11. The method as recited in claim 1, wherein defining the resource metrics for a set of virtual machine instance types and defining the one or more applications for each of the set of virtual machine instance types is determined statically.

12. A system managing virtual machine instance types comprising:
  a data store, implemented on a computing device, for maintaining information associated with a set of clustered applications and resource optimizations for the set of clustered applications; and
  a resource optimization manager component, implemented on a computing device, the resource optimization manager component for:
  defining clusters of applications based on similarities in at least a subset of obtained resource metrics for a set of virtual machine instance types;
  associating a target application with one or more clusters of applications based on matched resource metrics for the target application, wherein the target application is not currently associated with the definition of clusters of applications;
  causing at least one of the implementation of resource optimizations for a target virtual machine instance type and a publication of the resource optimizations for the target virtual machine instance type, wherein the resource optimizations are based on resource optimizations associated with the associated cluster of applications; and
  updating the definition of the clusters of applications associated with the target application to include the target application.

13. The system as recited in claim 12, wherein the set of virtual machine instance types includes at least one of frequency of central processing unit usage, memory latency and sustained bandwidth, disk latency and bandwidth, general network latency and bandwidth, and graphics processing unit usage.

14. The system as recited in claim 12, wherein the resource optimization manager component is operable to identify at least one resource metric having a maximum number of different values in defining the clusters of applications.

15. The system as recited in claim 12, wherein the resource optimization manager component is operable to obtain a definition of resource metrics for the target application from an external source.

16. The system as recited in claim 12, wherein the resource optimization manager component is operable to observe resource metrics for the target application from an external source.

17. The system as recited in claim 12, wherein the resource optimization manager component determines that the target application can be associated with a plurality of clusters of applications.

18. The system as recited in claim 17, wherein the resource optimization manager component determines at least one additional resource metric for selecting among the plurality of clusters of applications.

19. The system as recited in claim 12, wherein the resource optimizations for the target application includes obtaining a definition of at least a minimum and maximum set of virtual resources for the target application based on the minimum or maximums shared by the clustered applications.

20. A method for implementing a resource optimization manager component, comprising:
  obtaining a definition of clusters of applications based on similarities in at least a subset of obtained resource metrics for a set of virtual machine instance types;
  associating a target application with one or more clusters of applications based on matched resource metrics for the target application, wherein the target application is not currently associated with the definition of clusters of applications;
  causing at least one of the implementation of resource optimizations for a target virtual machine instance type and a publication of the resource optimizations for the target virtual machine instance type, wherein the resource optimizations are based on resource optimizations associated with the associated cluster of applications; and
  updating the definition of the clusters of applications associated with the target application to include the target application.

21. The method as recited in claim 20 further comprising defining clusters of applications based on similarities in at least a subset of the obtained resource metrics for the set of virtual machine instance types.

22. The method as recited in claim 21, wherein defining cluster of applications includes identifying at least one resource metric having a minimum number of different values.

23. The method as recited in claim 20, further comprising obtaining resource metrics for the target application.

24. The method as recited in claim 20, wherein associating, by the resource optimization manager, the target application with one or more clusters of applications includes associating the target application with a plurality of clusters of applications.

25. The method as recited in claim 24 further comprising determining at least one additional resource metric for selecting among the plurality of clusters of applications.

26. The method as recited in claim 20, wherein obtaining resource optimizations for the target application includes obtaining a definition of at least a minimum and maximum set of virtual resources for the target application based on the minimum or maximums shared by the clustered applications.

27. The method as recited in claim 20, wherein obtaining a definition of clusters of applications based on similarities in at least a subset of obtained resource metrics for a set of virtual machine instance types includes:
- defining, by the resource optimization manager, resource metrics for a set of virtual machine instance types, wherein each of the virtual machine instance types is associated with one or more applications executed by the virtual machine instance type;
- defining, by the resource optimization manager, one or more applications for each of the set of virtual machine instance types; and
- defining, by the resource optimization manager, clusters of applications based on similarities in at least a subset of the obtained resource metrics for the set of virtual machine instance types.

* * * * *